Nov. 15, 1955  G. J. SOLBERG  2,723,672
CHIROPODIST'S BURR
Filed May 20, 1952
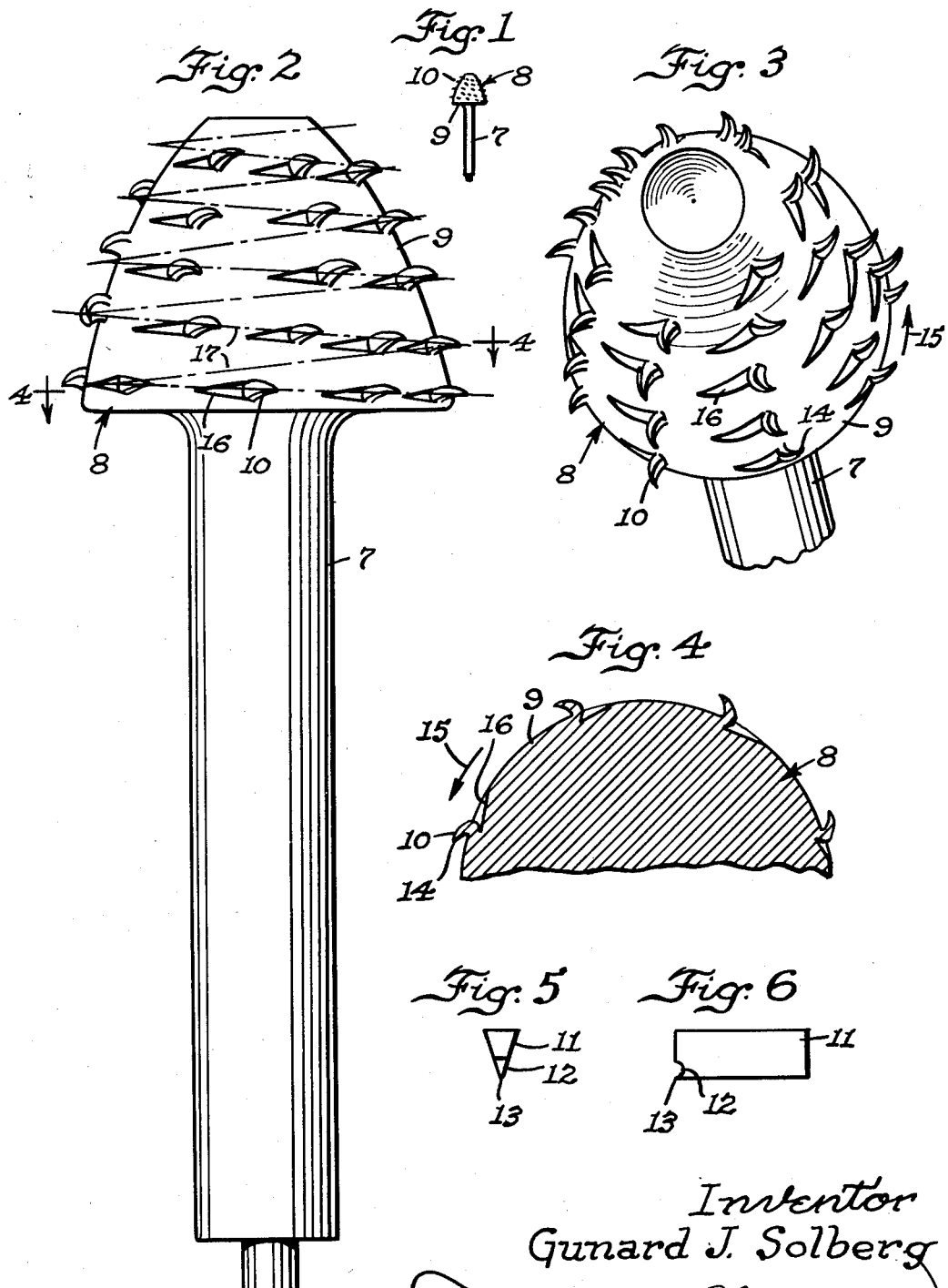
Inventor
Gunard J. Solberg

United States Patent Office 2,723,672
Patented Nov. 15, 1955

2,723,672

CHIROPODIST'S BURR

Gunard J. Solberg, Beloit, Wis.

Application May 20, 1952, Serial No. 288,787

3 Claims. (Cl. 132—75.8)

This invention relates to a chiropodist's burr for the painless and speedy removal of corns, bunions, and callouses.

The principal object is to provide a tool of the kind mentioned consisting of a rotary head having curved, tapered, sharply pointed cutting teeth that are integral with the head, the same being gouged out of the circular periphery of the head in circumferentially spaced relation, all curved in the direction of rotation and projecting from the otherwise smooth circular periphery of the head just far enough to do fine painless cutting that reduces the skin to a fine powder which drops off or is blown away with the air currents set up in the high speed rotation of the tool.

An especially advantageous feature of the tool is its freedom from any tendency to clog during operation, this being due, in part, to the fineness of the powdered skin that it produces in its operation, and, in part, to the form of the teeth and the construction of the head, the shallow troughs that are formed in the head by the gouging out of the metal for the teeth being behind the teeth, so that nothing is apt to collect therein, and the periphery of the head being, otherwise, smooth and flush in front and on both sides of each tooth, so that there is no place for chips and shavings and powdered skin to become lodged.

Another important object is the provision of an improved method of removing corns, bunions, and callouses, which consists in the reduction of such growths by what may best be described as a minute milling operation. This enables gradually removing the skin to exactly the depth desired and without any sensible pain, the operation being not only painless but being devoid of any danger whatsoever of causing infection and leaving the surface treated quite smooth in contrast to the whittled surface obtained with any ordinary cutting tool.

The invention is illustrated in the accompanying drawing, in which—

Fig. 1 is a side view of a burr made in accordance with my invention and shown substantially full size;

Fig. 2 is an enlargement of Fig. 1, better to illustrate the invention;

Fig. 3 is a perspective view of the head with a portion of the shank broken away;

Fig. 4 is a sectional detail on the line 4—4 of Fig. 2, and

Figs. 5 and 6 are an end view and side view of a tool bit used in the cutting of the teeth of the burr.

The same reference numerals are applied to corresponding parts throughout these views.

Referring to the drawing, the reference numeral 7 designates a metallic cylindrical shank of the burr of my invention, indicated generally by the reference numeral 8, which is adapted to be gripped in a chuck on the end of an armature shaft of a small, light weight, electric motor, so that the burr may be guided in its operation using the motor as a handle. Of course, the drive motor may be in remote relation to the burr and drivingly connected thereto by a flexible shaft, in which case the burr is on a shaft in a hand piece. The burr 8 consists of a head 9 provided on the outer end of the shank 7 in coaxial relationship thereto, and, while I have shown a head of beehive shape, it should be understood that I do not limit the invention to that or any other specific shape. The size of the head, indicated in Fig. 1, is also merely illustrative of one embodiment and may be varied without departing from the spirit of my invention. Cold rolled steel is suitable for this burr, and after the small cutting teeth 10 are cut out of the periphery in the form of integral barbs, tangs, or claws, the burr is preferably cyanided and a flash plating of hard chrome is applied, to eliminate likelihood of rusting.

In the cutting of the teeth 10, a tool steel bit 11 of triangular cross-section, illustrated in Figs. 5 and 6, is used, each tooth being produced by turning the head as the bit is fed toward and into the head on a line parallel to a tangent. The cutting end of the bit is relieved on an arc, as indicated at 12, to define the sharp point 13, the sharpness of which, of course, determines the ultimate sharpness of the points 14 on the teeth 10 cut from the head 9. These teeth due to the curvature of the plow point, indicated at 12, are given the curvature best illustrated in Fig. 4. The curvature is in the direction of rotation of the head, indicated by the arrow 15 in Figs. 3 and 4. Due to the direction of the cut, the teeth 10 are uniformly tapered from base to tip, and are, therefore, quite sturdy and not at all apt to break off. The troughs 16 behind the teeth are not at all objectionable and do not collect chips or shavings in the operation of the burr. In fact, the burr can properly be said to be self-cleaning, because the surfaces in front and on both sides of each tooth are smooth and there is no place for anything to collect, and the fineness of the cuttings is such that the air currents set up by the teeth in the speedy turning of the head is enough to carry away this fine material as fast as it is produced in the operation of the burr.

In operation, due to the fact that the smooth periphery of the head between the cutting teeth serves by contact with the surface being operated upon to gauge the depth of cutting, there is no danger of ever cutting too deep and the cutting is quite uniform. Also, because the teeth 10 are arranged in a helix, as indicated by the dot and dash centerlines 17 in Fig. 2, the cutting action of each tooth, fine as it is, is overlapped by the cutting action of neighboring teeth, so that the surface of the skin of a human foot or hand with which the cutter head has been brought into contact will be substantially as smooth as it was before, and, of course, that is very important because of the increased sensitiveness of the area after such a treatment. Chiropodist's patients find that there is no need of apprehension in the use of the burr on corns, callouses, bunions, and the like, because the objectionable skin is removed so gradually and so painlessly by this minute milling operation some patients are actually not even aware when the operation is under way. The slices cut are so fine that they fall apart and appear as powder and are cleared away as fast as they are produced, being light enough to be blown away in the air currents set up in the rotation of the burr. There is no indication whatsoever of any tendency toward clogging due to the fact that the troughs 16 are all behind the cutting teeth 14, and that is important not only from the standpoint of efficiency in operation but also from the standpoint that the chiropodist in using the burr is assured that he will always have the same maximum depth of cut or mill available and can be guided accordingly in the use of the burr. Due to the fineness of cutting or milling, there is much less likelihood of an experienced chiropodist cutting too much of the skin away, and this gradual removal is particularly beneficial when it comes to the removal of corns where it is particularly important that the entire core be removed without, however, going too deep.

It is believed the foregoing description conveys a good understanding of the objects and advantages of my invention. The appended claims have been drawn to cover all legitimate modifications and adaptations.

I claim:

1. A chiropodist's burr comprising a rotary drive shank having a coaxial metallic head on one end, said head having a smooth circular periphery on which are provided in circumferentially spaced relation, and arranged in a helix so as to be also spaced longitudinally of the head, a plurality of small outwardly tapered and sharply pointed and forwardly curved cutting teeth that are narrow at their greatest base width in relation to their length, adapted in the fast rotation of the head to perform a minute milling operation on the hardened or calloused skin of a human foot or hand with which the head is brought into contact, so as to reduce such skin to a powdery consistency.

2. A burr as set forth in claim 1, wherein the cutting teeth are integral extensions of the head that project outwardly from the head in front of the troughs formed in the production of the teeth.

3. A burr as set forth in claim 1, wherein the cutting teeth are integral extensions of the head that project outwardly from the head in front of the troughs formed in the production of the teeth, the completed head being suitably plated to resist corrosion.

References Cited in the file of this patent

UNITED STATES PATENTS

| | | |
|---|---|---|
| 1,096,875 | Weeks | May 19, 1914 |
| 1,631,212 | King | June 7, 1927 |
| 1,869,197 | Holz | July 26, 1932 |
| 2,068,622 | Ufer | Jan. 19, 1937 |
| 2,070,730 | Hellstrom | Feb. 16, 1937 |
| 2,563,163 | Exibard | Aug. 7, 1951 |

FOREIGN PATENTS

| | | |
|---|---|---|
| 641,587 | France | Aug. 7, 1928 |
| 286,504 | Italy | June 13, 1931 |